No. 874,095. PATENTED DEC. 17, 1907.
L. W. MAMMEN.
GEARING FOR WASHING MACHINES.
APPLICATION FILED APR. 3, 1907.
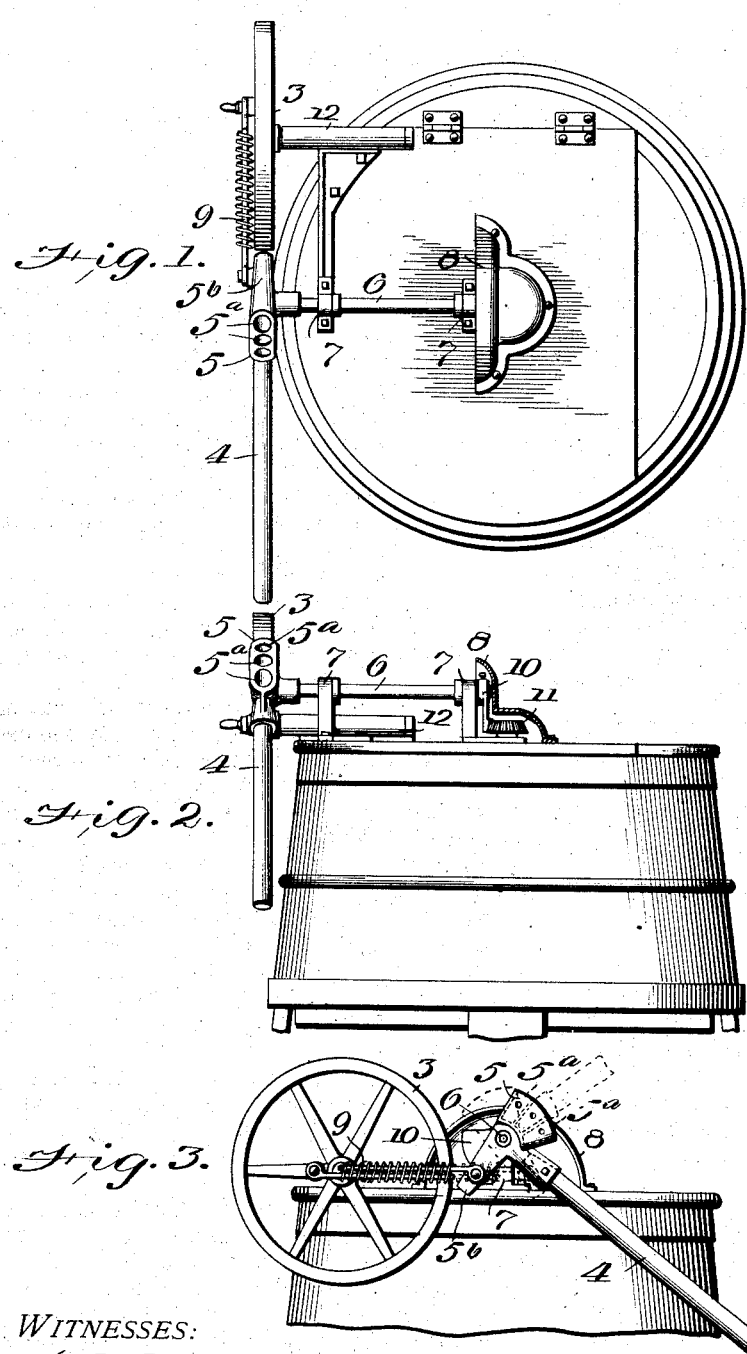
WITNESSES: INVENTOR
Lawrence W. Mammen.
By
Attorneys

UNITED STATES PATENT OFFICE.

LAWRENCE W. MAMMEN, OF CHICAGO, ILLINOIS.

GEARING FOR WASHING-MACHINES.

No. 874,095.

Specification of Letters Patent.

Patented Dec. 17, 1907.

Application filed April 3, 1907. Serial No. 366,117.

*To all whom it may concern:*

Be it known that I, LAWRENCE W. MAMMEN, citizen of the United States, residing at Chicago, in the county of Cook and State of Illinois, have invented certain new and useful Improvements in Gearing for Washing-Machines, of which the following is a specification.

This invention relates to alternating rotary gearing particularly adapted for use in connection with washing machines.

The object of the invention is to produce a gearing of simple construction, without the use of a considerable number of gear wheels, and having a minimum of friction, and consequently requiring less power for its operation; and also in which energy will be stored up sufficient to cause the reverse or back stroke, avoiding, however, the danger of a high speed fly wheel.

A further object of the invention is to provide an improved head for the attachment of the operating lever.

In the accompanying drawings, Figure 1 is a plan view showing the gearing. Fig. 2 is a side elevation thereof. Fig. 3 is an end elevation thereof.

Referring specifically to the drawings, 4 indicates an operating lever which may be placed in any one of a series of sockets 5ª in a head 5 fixed to the outer end of a rock shaft 6, which is supported by bearing brackets 7 on the top of the washing machine box. At the inner end the rock shaft has a segment gear 10 in mesh with a bevel pinion 11 on the top of the shaft of the washing machine rubber. A shield 8 covers the gearing.

The head 5 has a depending arm 5ᵇ which is connected by a spring pitman 9 to a crank pin on the fly wheel 3 the shaft of which is carried in a bearing bracket 12 fixed to the frame of the machine.

Any suitable kind of spring pitman may be used. I have shown the same formed of a pair of rods which lap each other, the lapped portions being inclosed within a coiled spring one end of which is attached to the end of one rod and the other end of which is attached to the end of the other rod. This allows the spring to expand or contract in accordance with the stroke.

In operation, the lever may be placed in any one of the sockets, and is bolted therein. By this means the angle of the lever can be varied to suit the convenience of the operator. On vibration of the lever the shaft 6 is rocked and the rubber is given an alternating motion. At the same time the fly wheel is revolved, and pressure in one direction causes the spring pitman either to extend or compress the spring, thereby storing up energy which, after the pitman passes the dead point, assists in reversing the stroke of the rubber and in returning the lever to its original position.

I am aware that alternating rotary gearing has heretofore been constructed for a similar use in which the rock shaft is geared in one way or the other to a high speed fly wheel, a plurality of gears being used. This is expensive and causes considerable friction, as well as danger from the gearing. By the use of the fly wheel and spring pitman directly connected to the operating lever the same result with respect to storing power is obtained, and the fly wheel does not run at any greater speed than the rock shaft. The spring pitman avoids all jarring, and works noiselessly. The head with a series of sockets at different angles allows the operator to change the handle from one position to another and thereby avoid the fatigue incident to long continued operation in one position.

I claim:

1. The combination of a driven shaft, a rock shaft geared thereto, an operating lever connected to the rock shaft, a fly wheel, and a longitudinally-yieldable pitman connecting the lever and fly wheel.

2. The combination of a driven shaft, a rock shaft geared at one end thereto, a head on the other end of the rock shaft, having a projecting lever handle and also a projecting arm, a fly wheel, and a longitudinally-yieldable pitman connecting the arm and the fly wheel.

In testimony whereof I affix my signature, in presence of two witnesses.

LAWRENCE W. MAMMEN.

Witnesses:
NELLIE FELTSKOG,
H. G. BATCHELOR.